Patented May 19, 1931

1,805,713

UNITED STATES PATENT OFFICE

CHARLES E. BRADLEY, OF MISHAWAKA, INDIANA, ASSIGNOR TO MISHAWAKA RUBBER AND WOOLEN MANUFACTURING COMPANY, OF MISHAWAKA, INDIANA, A CORPORATION OF INDIANA

RUBBER TREATING METHOD AND PRODUCT

No Drawing.   Application filed June 30, 1928.   Serial No. 289,631.

My invention relates to rubber softening, and has reference more particularly to the conjoint use of such agents as air and steam for softening, and also the subsequent drying preferably by superheated low pressure steam.

In the preparation of crude rubber for manufacturing purposes it is necessary to break down or soften the rubber for compounding, and this has been accomplished heretofore by grinding the rubber in mills.

I have found, however, that by employing a mixture of air and steam and subjecting rubber to this mixture under appropriate pressures and temperatures, I obtain a rapid and thorough softening and the method may be satisfactorily used in place of milling or grinding to condition rubber for compounding.

The principal objects of my invention are to provide an improved method of softening rubber; to make practical use of air in softening rubber; to combine with air a medium which will counteract the undesirable action of air without impairing its softening properties; to utilize an activating agent such as steam which is easily obtainable; to control the temperature and pressure and relative proportions of air and steam and obtain proper softening to any desired extent; to provide a rubber softening which may be used in place of and dispenses with the mechanical grinding or milling heretofore required to prepare rubber for compounding; to provide an improved method of drying the rubber; to reduce the length of time required for drying; to obtain an improved softened rubber; and in general to simplify the softening and drying of rubber and minimize the time and expense of preparing rubber for compounding.

It is well known that air under the influence of heat has a marked softening effect on rubber, but it has certain disadvantages which have rendered its use impractical for this purpose. Moreover in the treatment of rubber by other methods in which heat is employed, precautions are taken to eliminate air for the sake of avoiding its well known tendency to impair the quality of the rubber.

I have found, however, that by utilizing steam with the air a highly efficient softening medium is provided and the detrimental effect of the air alone is practically eliminated.

My experiments have shown that the softening action of air on rubber is proportional to and increases with temperature and pressure. In other words, at a given temperature the action of the air increases with its pressure and at a given pressure of air the action increases with the temperature.

I have also discovered that combinations of steam and air are much more active and efficient at given temperatures and pressures than air alone.

The mixture of steam and air may be varied as to temperature and pressure and the proportions of steam and air regulated according to the character or duration of softening required. It is also desirable to control temperatures and pressures in order to regulate the rate and degree of softening and to duplicate softening treatments.

The treatment is carried out in a closed container into which steam is introduced at a pressure to give the required temperature, as for example from 240 to 300 degrees Fahrenheit, which said temperatures correspond to a range of approximately 10 to 50 pounds steam pressure. Air is also introduced into the container so that the increase in pressure in the container over and above that of the steam is for example, from 10 to 25 pounds, depending on the character of the rubber and the rate of softening desired. The above temperatures and pressures have been found to accomplish my purpose with crude rubbers in connection with which I have employed my invention, but it is possible that variation in these limits of temperatures and pressures may be found desirable with some kinds of conditions of rubber.

It is obvious that the more rapid the softening the more difficult it is to control, and I have found that a pressure of 10 pounds of air and a temperature of 275 degrees Fahrenheit (which is equivalent to about 30 pounds of steam pressure) or a total pressure of about 40 pounds in the container at a temperature of 275 degrees Fahrenheit is sufficient to give a satisfactory and practical rate of softening with the usual grade of crude rubber. By regulating the steam so as to maintain the temperature in the container at 275 degrees Fahrenheit and by regulating the air so as to maintain the pressure at 40 pounds, the relative proportions of steam and air are kept constant and the desired degree of softening may be obtained by merely varying the length of time that the rubber is exposed to the 40 pounds pressure and 275 degrees temperature in the container.

After the treatment has continued for the required length of time, approximately one-half to one hour being sufficient to give a product which is softened sufficiently for compounding, it is necessary to dry the rubber.

This may be accomplished in any usual manner, but in order to avoid the cost of extra handling, it is desirable to carry out the drying operation in the same container in which the softening operation is effected and have the softening and drying continuous instead of having to remove the rubber and reload it into separate drying kilns.

Drying wet steamed rubber in the vulcanizer in which the steaming operation is carried out, by employing the usual rubber drying methods, has not been found satisfactory. I have found, however, that by subjecting the rubber to active superheated low pressure steam, a rapid and satisfactory drying takes place, and the operation can be accomplished in the same container in which the rubber is softened, by merely providing connections for supplying superheated steam.

With this method of drying, the pressure which was maintained in the container for softening the rubber is, after the softening is completed, bled down to a minimum, approximately two pounds above atmospheric in the container. Steam is then introduced into the chamber and superheated to 300 to 320 degrees Fahrenheit, and the inlets and outlets arranged so that a current of live steam is constantly being circulated through and carried out of the vulcanizer with a pressure maintained at a minimum of say one to two pounds above atmospheric to obtain the benefit of the heigher rate of evaporation at low pressures.

The superheated steam at minimum pressure provides a current of an inert medium capable of absorbing moisture and proves a more rapid drying agent than the application of still vacuum on the heated rubber.

The drying process is regulated by burying recording thermometers in the rubber when the latter is introduced into the chamber, and this wet rubber causes the thermometer bulb buried in it to behave as a wet bulb thermometer while the rubber is wet. Other recording thermometers are suspended in the atmosphere of the chamber and behave as dry bulb thermometers giving the temperature of the superheated steam. When the reading of the thermometer buried in the rubber approximates the reading of the thermometers suspended in the chamber, it signifies that the rubber is dry. The drying process is then discontinued and the rubber removed from the chamber.

The above method of softening rubber may be used in connection with other drying processes and the drying process described herein may be used for drying rubber other than that softened by the above described process. It is preferred, however, to use them conjointly as they work together nicely and effect an economy in equipment, time and labor in conditioning the rubber.

The softening process may be employed to soften rubber to any extent and for any purpose. By the use of such an active softening medium as mixtures of steam and air, I have been able to carry the softening action on crude rubber to a point where I can completely eliminate the grinding operation which is carried out on rubber preliminary to compounding and which ordinarily extends over a period of from thirty minutes to an hour, depending upon the softness of the crude in question. This is made practical by the steam air combination, which is approximately twenty times as rapid as inert steam and five times as rapid as air at the same temperature and therefore, permits of a larger production from a given container in a minimum time with consequent lower expense in labor and power, and it is possible to soften the rubber by heat treatment alone, so that it will compare favorably or to advantage with the same rubber softened by the usual mechanical grinding operation. The cost of softening by the steam air method is lower than by other processes because it is more rapid, involves less steps and permits a larger production from a given equipment. Quality tests of the softened rubber made by my steam air treatment as measured by tensile and wear are equal or slightly superior to the results obtained on a given rubber reduced to the same softness by the ordinary milling operations.

While I have described my invention in a preferred form, I am aware that various changes and modifications may be made without departing from the principles of my invention, the scope of which is to be determined by the appended claims.

I claim as my invention:

1. The method of treating rubber which compress subjecting wet rubber to free oxygen and heat without drying.

2. The method of treating rubber which comprises subjecting wet rubber to heated air while maintaining sufficient moisture in the rubber to avoid drying thereof by the heated air.

3. The method of treating rubber which comprises subjecting thoroughly moist rubber to heated air, and avoiding the drying action of the heated air on the rubber by preventing diminution of moisture in the rubber.

4. The method of treating rubber which comprises subjecting thoroughly moist rubber to a mixture of heated air and steam, the latter being sufficient in quantity and pressure to prevent drying of the rubber by the heated air.

5. The method of treating rubber which comprises thoroughly impregnating the rubber with moisture and subjecting the moisture impregnated rubber to heated air while retaining sufficient moisture in the rubber to prevent drying thereof.

6. The method of treating rubber which comprises subjecting thoroughly moistened rubber simultaneously to air and steam at a pressure substantially above atmospheric for approximately one half hour or more.

7. The method of treating rubber which comprises subjecting thoroughly moistened rubber simultaneously to air and steam at a pressure of approximately thirty pounds or more for approximately one half hour or more.

8. The method of treating rubber which comprises subjecting thoroughly moistened rubber to a steam and air mixture at a temperature substantially above 200 degrees Fahrenheit.

9. The method of treating rubber which comprises subjecting thoroughly moistened rubber to a mixture of steam and air at a pressure of approximately 30 pounds or more and a temperature of approximately 240 degrees Fahrenheit or more.

10. The method of treating rubber which comprises subjecting thoroughly moist rubber to a mixture of steam and air at a pressure of 30 pounds or more and a temperature of 200 degrees Fahrenheit or more for one half hour or more, then reducing the pressure to about 2 pounds and subjecting the rubber at the latter pressure to a current of steam at approximately 300 degrees Fahrenheit or more.

CHARLES E. BRADLEY.